US009672339B2

(12) United States Patent
Lange

(10) Patent No.: US 9,672,339 B2
(45) Date of Patent: Jun. 6, 2017

(54) ELECTRO-BIOMETRIC AUTHENTICATION

(71) Applicant: Intel Corporation, Santa Clara, CA (US)

(72) Inventor: Daniel H. Lange, Kfar Vradim (IL)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 13/711,928

(22) Filed: Dec. 12, 2012

(65) Prior Publication Data
US 2014/0165184 A1 Jun. 12, 2014

(51) Int. Cl.
*G06F 21/00* (2013.01)
*G06F 21/32* (2013.01)

(52) U.S. Cl.
CPC .................................... *G06F 21/32* (2013.01)

(58) Field of Classification Search
CPC G06F 21/32; G06K 9/00496; G06K 9/00885; G06K 9/00536; G06K 2009/00939; G07C 9/00158
USPC .......................................................... 726/19
See application file for complete search history.

(56) References Cited

U.S. PATENT DOCUMENTS

| 7,689,833 | B2* | 3/2010 | Lange | A61B 5/04525 382/115 |
| 7,773,780 | B2* | 8/2010 | Schneider | G06F 21/32 340/5.82 |
| 7,809,170 | B2* | 10/2010 | Phoha | 382/115 |
| 7,809,954 | B2* | 10/2010 | Miller et al. | 713/186 |
| 8,412,158 | B2* | 4/2013 | Forutanpour et al. | 455/411 |
| 8,651,373 | B1* | 2/2014 | Block et al. | 235/379 |
| 8,719,911 | B2* | 5/2014 | Novack | H04L 9/3231 726/7 |
| 8,768,838 | B1* | 7/2014 | Hoffman | G06Q 40/00 705/44 |
| 8,997,191 | B1* | 3/2015 | Stark | G06F 21/32 713/173 |
| 9,094,211 | B2* | 7/2015 | Klevan | H04L 9/3231 |
| 2002/0128867 | A1* | 9/2002 | Goetzke et al. | 705/2 |
| 2002/0138743 | A1* | 9/2002 | Murakami et al. | 713/186 |
| 2002/0152034 | A1* | 10/2002 | Kondo | G06K 9/00 702/19 |
| 2002/0162031 | A1* | 10/2002 | Levin et al. | 713/202 |
| 2003/0073917 | A1* | 4/2003 | Echauz et al. | 600/510 |
| 2003/0126448 | A1* | 7/2003 | Russo | G06K 9/00026 713/186 |
| 2004/0064453 | A1* | 4/2004 | Ruiz | G06F 21/32 |
| 2004/0133582 | A1* | 7/2004 | Howard et al. | 707/100 |
| 2005/0022034 | A1* | 1/2005 | Chaudhari et al. | 713/202 |
| 2005/0050367 | A1* | 3/2005 | Burger | G06F 21/32 726/19 |
| 2005/0273333 | A1* | 12/2005 | Morin et al. | 704/247 |

(Continued)

OTHER PUBLICATIONS

Sufi, et al, 'ECG-Based Authentication', Springer 2010, Handbook of Information and Communication Security, pp. 309-331, http://goanna.cs.rmit.edu.au/~jiankun/Sample_Publication/ECG_Based.pdf.*

(Continued)

*Primary Examiner* — Luu Pham
*Assistant Examiner* — Ronald Baum
(74) *Attorney, Agent, or Firm* — Trop Pruner & Hu, P.C.

(57) ABSTRACT

Electro-biometric data obtained from a user of a processor-based device may be used to authenticate that user. In some cases, no special action may need to be taken to initiate authentication.

8 Claims, 2 Drawing Sheets

(56) References Cited

U.S. PATENT DOCUMENTS

| | | | |
|---|---|---|---|
| 2005/0288954 A1* | 12/2005 | McCarthy et al. | 705/1 |
| 2006/0031102 A1* | 2/2006 | Teller et al. | 705/3 |
| 2006/0115129 A1* | 6/2006 | Abe | G06K 9/00885 382/115 |
| 2006/0210119 A1* | 9/2006 | Willis | G06K 9/00892 382/115 |
| 2007/0061166 A1* | 3/2007 | Ramasubramanian et al. | 705/2 |
| 2008/0097550 A1* | 4/2008 | Dicks et al. | 607/59 |
| 2008/0104415 A1* | 5/2008 | Palti-Wasserman et al. | 713/186 |
| 2008/0214903 A1* | 9/2008 | Orbach | G06Q 50/22 600/301 |
| 2008/0229408 A1* | 9/2008 | Dinges et al. | 726/19 |
| 2008/0294907 A1* | 11/2008 | Hively | 713/186 |
| 2009/0003663 A1* | 1/2009 | Webster | 382/119 |
| 2009/0185723 A1* | 7/2009 | Kurtz et al. | 382/118 |
| 2009/0234198 A1* | 9/2009 | Vorse | 600/301 |
| 2009/0271343 A1* | 10/2009 | Vaiciulis | G06N 99/005 706/21 |
| 2009/0328200 A1* | 12/2009 | Phoha | G06F 21/32 726/19 |
| 2010/0162386 A1* | 6/2010 | Li et al. | 726/19 |
| 2010/0217837 A1* | 8/2010 | Ansari et al. | 709/218 |
| 2010/0331649 A1* | 12/2010 | Chou | 600/364 |
| 2011/0092825 A1* | 4/2011 | Gopinathan et al. | 600/483 |
| 2011/0126024 A1* | 5/2011 | Beatson | G06F 21/32 713/186 |
| 2011/0213700 A1* | 9/2011 | Sant'Anselmo | 705/39 |
| 2012/0036261 A1* | 2/2012 | Salazar et al. | 709/225 |
| 2012/0109851 A1* | 5/2012 | Sanders | 705/400 |
| 2012/0150651 A1* | 6/2012 | Hoffberg et al. | 705/14.58 |
| 2012/0151515 A1* | 6/2012 | Atsmon | G06F 21/34 725/23 |
| 2013/0013327 A1* | 1/2013 | Horseman | 705/1.1 |
| 2013/0054576 A1* | 2/2013 | Karmarkar et al. | 707/722 |
| 2013/0111580 A1* | 5/2013 | Checco | G06K 9/00167 726/19 |

OTHER PUBLICATIONS

Rostami, et al, 'Heart-to-Heart (H2H): Authentication for Implanted Medical Devices', acm.org., CCS'13, Nov. 4-8, 2013, entire document, http://www.arijuels.com/wp-content/uploads/2013/09/RJK131.pdf.*

U.S. Appl. No. 13/711,973, filed Dec. 12, 2012, entitled "Multi Electro-Biometric User Recognition."

U.S. Appl. No. 61/722,857, filed Nov. 6, 2012, entitled "Determining Social Sentiment Using Physiological Data."

* cited by examiner

ELECTRO-BIOMETRIC AUTHENTICATION

BACKGROUND

This relates to authentication of users of processor-based devices.

Because of the ever-increasing volume of secure transactions taking place over computerized devices, the need for user authentication is similarly increasing. Because transactions may be undertaken between a remote user and a server, such as a bank server, or other servers where security is important, there is a heightened need to be sure that the person who is remotely connecting to the server is who the person says the person is. The reasons for this include the prevention of fraud, theft of funds, and unauthorized access to servers and other computer systems.

Password protection is widely used at present but is woefully inadequate. Passwords can be stolen using random generation and an observer may be able to discern the password entry and thereby gain unauthorized entry. Users commonly forget passwords. This means that the passwords must be ever more complicated, increasing the likelihood that consumers will have trouble remembering them. Moreover, because of different password rules for different servers, users must generate a plurality of passwords, making user retention of those passwords ever more difficult.

BRIEF SUMMARY OF THE INVENTION

In some embodiments, a computer executed method may extract data from electrophysiological signals belonging to an individual. That data may be used to authenticate the individual.

BRIEF DESCRIPTION OF THE DRAWINGS

Some embodiments are described with respect to the following figures.

DETAILED DESCRIPTION

Figure 1:
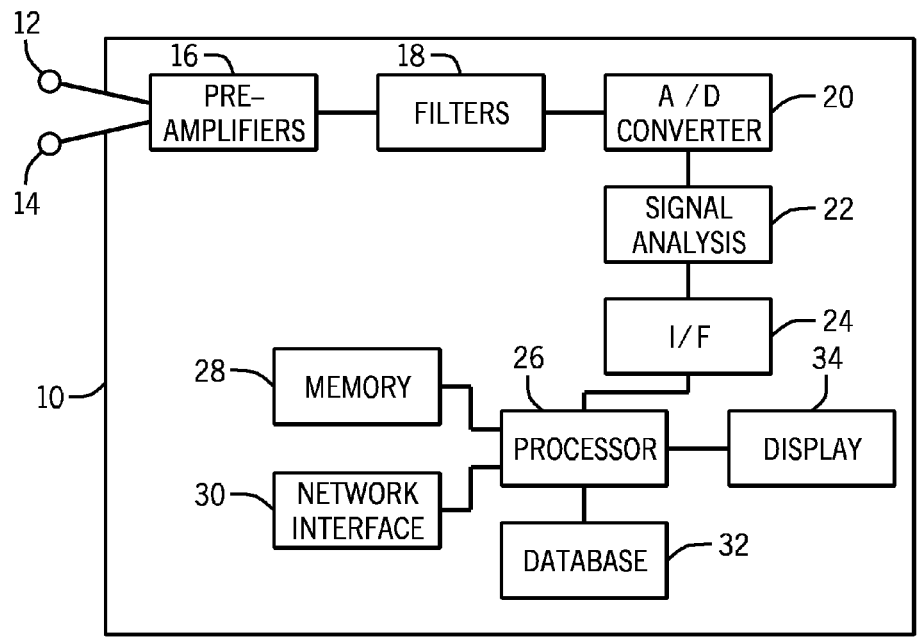
FIG. 1 is a block diagram of exemplary system for practicing embodiments according to the present technology.

Healthcare may be coupled with existing everyday activities, such that healthcare data is seamlessly and transparently acquired and kept up-to-date, providing an inherent solution to user compliance and improving consumer healthcare.

Biometric authentication replacing or supplementing common use of passwords, when based on measurement of the same physiological modality as used for healthcare, provides a solution to coupling consumer healthcare with a daily (or more frequent) activity. Thus, electro-biometric based authentication may replace passwords and seamlessly enable consumer healthcare analyses. As used herein, "electro-biometric" means "based on electrical signals generated from one or more distinguishing user physiological characteristics."

In some embodiments, a user utilizes an electrocardiogram (EKG) based authentication apparatus by touching a pair of conductive contacts or other sensor(s). Consequently, heart-beat data is collected for biometric matching processing, as well as for fine tuning of the biometric signature space as time goes by.

The same heart-beat data may also be analyzed online or saved for future offline analyses. Example analyses might include calculation of the heart-rate by counting the number of heart-beats per minute, estimation of level of stress and mood using heart-rate variability analyses, and time-locked averaging for establishing a high quality EKG complex for diagnosis of heart conditions.

An ever expanding or adaptive database, increasing with every use of the authentication apparatus, may be used to establish personal average statistical norms as well as personal time-varying statistical norms. These norms can subsequently be used to detect abrupt changes or gradual shifting trends in certain healthcare indices, which might indicate that the user is operating outside of his or her normal comfort zone or that his or her normal comfort zone is shifting.

Such indications might be used to alert the user or a pre-assigned third party, such as a caregiver, to an uncharacteristic situation such as a high level of stress, change of mood, high pulse rate, or atypical change in the EKG waveform. In terms of the synergism of coupled functionality and data collection of the biometrics and healthcare sub-systems working in tandem, the sub-systems are derived from and reciprocally support the other important processes. These processes may include but are not limited to:

a) when a user identity is rejected by the biometric system, the data is not stored so as not to contaminate one user's database with data acquired from a non-licensed user;

b) when a user turns on a healthcare application, and submits his or her EKG data for analysis, the same data may be used for fine tuning of the biometric signature space of the user; and c) with either authentication or healthcare transactions, correlating biometric signatures with healthcare indices to establish relationships between the biometric signatures and healthcare indices enhances the analytic and diagnostic capabilities of each sub-system.

In some embodiments certain consumer healthcare indices may be extracted from EKG (or ECG) data belonging to an individual. Deviations from standard statistical norms belonging to the individual may be calculated. The standard norms may be established and adjusted periodically or a periodically for except when individual performs an authentication transaction using a computing apparatus. The present technology is not limited to EKG. The utilization of any suitable dynamic physiological systems (e.g. electroencephalography (EEG), electromyography (EMG), electrooculography (EOG), electroretinography (ERG), whether provoked or resting), is contemplated.

Consumer healthcare indicates may include heart rate, level of stress, mood, EKG diagnostic landmarks, as well as any other indices that can be extracted from a heartbeat. Deviations from the standard norms may be defined as changes exceeding certain norm thresholds. Norm thresholds may be calculated as representing values with some statistical probability, such as values external to an average plus/minus an x number of standard deviations. Deviations would be evaluated as outlying data with associated degree of random improbability, which can be employed to determine whether healthcare statistical norms need to be altered.

In some embodiments according to the present technology, a method and system are provided for collecting biometric EKG data when an individual submits his or her EKG data for healthcare analyses.

When a user comes into contact with one or more sensors (e.g. two electrodes), electro-physiological signals are read and an authentication check is performed to determine if the current user is the registered user. If not, then the identity of the user is rejected. A message indicating identity rejection may be displayed, and the user may be given a chance to enter a password in order to authenticate.

The system 10 of FIG. 1 may include one or more processors 26 and memory 28. The memory 28 may store, in part, instructions and data for execution by the processor 26. The memory 28 may store executable code when in operation. The system may also be incorporated in any processor-based system input/output device including a touch pad, a keyboard, or a mouse as examples. It may be incorporated into input/output device elements, such as keys, that need to be touched anyway to operate the device.

In some embodiments, the sensor(s) may be part of a consumer device (e.g. a cell phone) or of its housing. Measurements may be taken whenever the user touches or picks up the device (assuming the user is properly authenticated). This allows for data to be recorded over a period of time without any thought or effort on the part of the user.

The database 32 may include a mass storage device and portable storage medium drive(s). The mass storage device may be implemented with a magnetic disk drive or an optical disk drive, which may be a non-volatile storage device for storing data and instructions for use by the processor 26. The mass storage device can store system software for implementing embodiments according to the present technology for purposes of loading that software into the memory 28.

Also coupled to the processor 26 are a network interface 30 and a display 34. The network interface 30 may allow the physiological information that is collected to also be used for medical analysis purposes. For example, a network interface would allow information about physiological conditions to be transmitted to a health professional for further analysis. Thus in some embodiments, the information that may be collected automatically upon use of a processor-based device may likewise be used for authentication as well as medical diagnoses and medical monitoring purposes. In some cases, the data that is captured may include additional information not specifically purposed for authentication but instead targeted to provide medical information to a healthcare professional. This medical information may be the same for all users or may be specifically targeted for conditions known or suspected to exist in a case of a particular individual.

The processor 26 may also be coupled to an interface 24. The interface 24 receives electro-biometric signals from the electrodes 12 and 14. In some embodiments the electrodes 12 and 14 may be body attachable electrodes including those of the type that are conventionally secured by removable adhesive as well as bare metal contacts that simply make contact with the skin. For example, in one embodiment the contacts may be spaced so as to touch either side of a user's finger, such as a user's index finger when the user is resting on a processor-based device. In some embodiments, the contacts may be positioned to contact a finger resting on a button or actuator in order to initiate operation of the processor-based device.

The electrodes 12 and 14 may be coupled to preamplifer 16, filters 18, and an analog digital converter 20. Signal analysis of the resulting signals may be obtained in block 22.

In some embodiments, information about heart rate and rhythm may be obtained in the form of voltage signals. In other embodiments, current signals may be obtained for example in connection with body impedance measurements.

Figure 2:
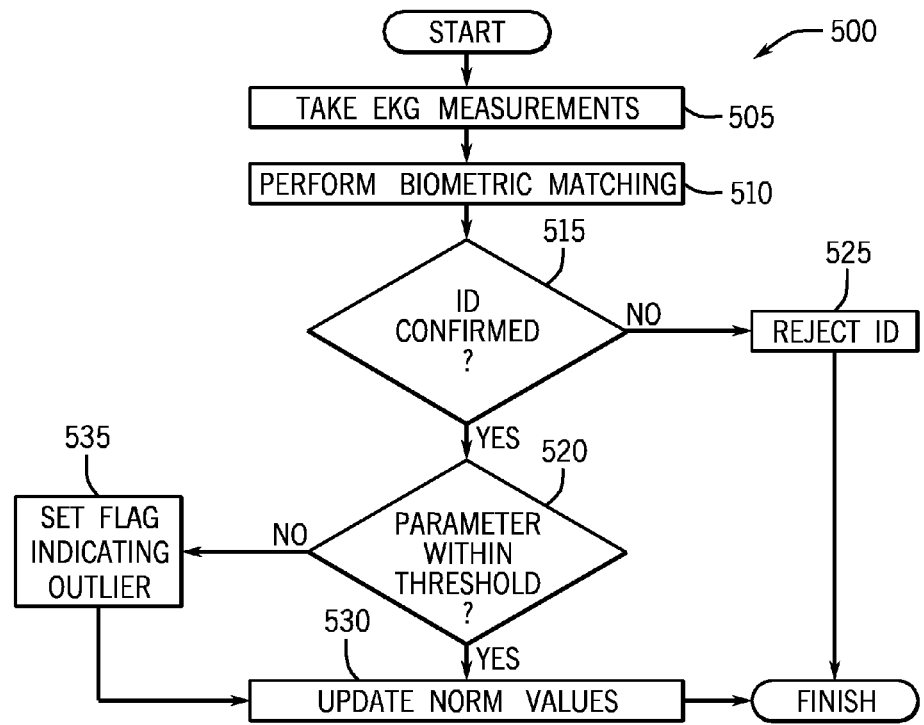
FIG. 2 is a flowchart of an exemplary method for practicing embodiments according to the present technology.

FIG. 2 shows a sequence for practicing embodiments according to the present technology. The sequence may be implemented in hardware, software, and/or firmware. In software and firmware embodiments, it may be implemented by computer executed instructions stored on one or more non-transitory computer readable media such as magnetic, optical or semiconductor storage.

At block 505, measurements are taken for a given period of time (e.g. up to 10 seconds, etc.). The measurements may be of electro-physiological signals, such as EKG signals, belonging to an individual. It is contemplated that various other signals may be measured in addition to or in place of EKG signals.

At block 510, in one embodiment, biometric matching is performed.

At diamond 515, if the identity of the user is confirmed, then process proceeds to diamond 520. If, on the other hand, the identity of the user is not confirmed then the process proceeds to block 525 where the identity of the user is rejected. However, the user may optionally be given the opportunity to enter a password in order to authenticate, thus allowing the process to proceed to diamond 520.

At diamond 520, a given healthcare parameter(s) is compared to its respective threshold. Depending on the parameter, the threshold is determined by comparison to accepted clinical or other accepted normal values or derived by comparison to baseline user data statistical distributions, or some combination thereof.

If the healthcare parameter(s) is within its respective normal threshold range, then the process proceeds to block 530. If the healthcare parameter(s) is not within its respective normal threshold range, then the process proceeds to step 535.

At block 530, norm values are updated if required for the given healthcare application(s). This may be accomplished by taking the current measurements and combining (e.g. averaging, etc.) then with previously stored data. Generally, increasing the frequency with which norms are calculated and the duration of taking measurements (both for a given instance and over a period of days or weeks) increases the accuracy of the data.

At block 535, the parameter(s) is not within its respective allowed threshold range, so a flag may be set indicating that this parameter(s) is an outlier. The outlier may be stored and the norm values updated. A message may be issued to the user and/or a healthcare practitioner indicating that there may be a medical issue. In some embodiments, if additional outliers are encountered at a sufficient frequency, then they are used to adjust the norm values. As outlier determination is based on probabilistic assumptions and/or formal determination of outliers. Whether to use the outlier to adjust norm values involves setting decision criteria which address these assumptions. If an outlier is defined on the basis of 3 standard deviations from the mean, its probability of occurrence is 0.3%. Using the binomial distribution and the probability, we can determine the probability of one or more outliers in a sample occurring by random chance. For example if a sample of 100 observations provides one such apparent outlier, the binomial distribution suggests that the probability of this happening by change is 22%; however, for 2 such outliers, this falls rapidly to 3%; for 3 outliers, 0.3% for 4, 0.02%. For most cases, according to statistical convention, we can probably accept that a random chance probability of less than 5% is grounds for re-evaluating the distribution parameters and norm values.

Figure 3:
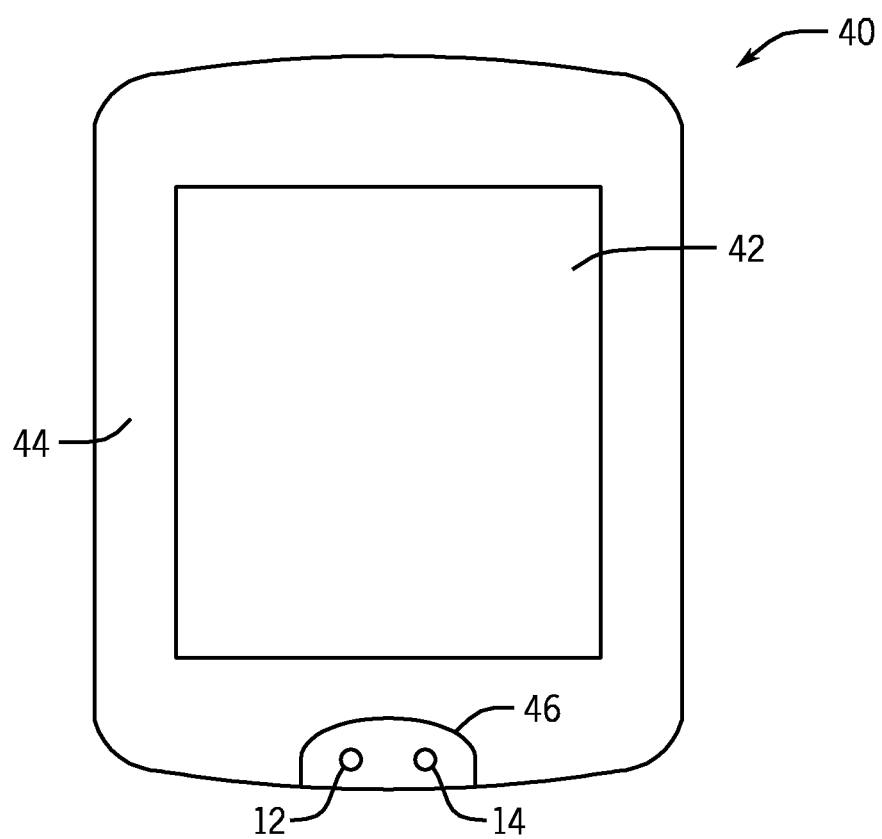
FIG. 3 is a front elevational view of one embodiment.

A processor-based device 40, namely any device that includes a processor, shown in FIG. 3 may be used in some embodiments of the present invention. It may be any processor-based device including a computer, a tablet, an e-book reader, a mobile Internet device, a cellular telephone, a watch, a remote control for a television or other entertainment device, or an entertainment device, to mention some examples. In many embodiments, the sensor may be incorporated into the body of the processor-based device and in some embodiments it may be incorporated into regions of the device on which the user must normally make contact. For example it may be incorporated into touchpads, user operable buttons, or other surfaces on the body where the user may make human contact, typically with the finger, with one or more fingers.

In some embodiments, two human body securable electrodes of contacts 12 and 14 may be used to make two different measurements of a characterizing human physiological condition. Thus, the processor-based device 40 may include a contact area 46 which may be simply the surface of a housing or a maybe a touch or pushbutton, normally pushed or touched in order to operate the device. In addition, the device 40 may typically have a display screen 42 surrounded by a housing 44.

In this example, when the user puts his or her fingers on the contact area 46, for example, to begin operation of the device, the user makes electrical contact with the two contacts 12 and 14. Then two different electro-biometric measurements may be made, in some embodiments seriatim automatically without even notifying the user. That is, simply by attempting to operate the device, the device may automatically, entirely on its own, take two biometric measurements and use those measurements in order to identify the user. The user may be identified, for example during the normal boot-up sequence of the device 40, and the user may in some cases have no idea that a biometric analysis for purposes of authentication has been undertaken. In some cases the device 40 cannot be used if authentication fails.

In addition, the physiological data that is captured may be stored and used for a variety of purposes. It may be used for monitoring the health of the individual user in some embodiments. It may be aggregated with information made over a computer network automatically with information from a variety of other users in order to track physiological trends.

The following clauses and/or examples pertain to further embodiments:

One example embodiment may be a computer executed method comprising extracting data from electro-physiological signals belonging to an individual, and using said data to authenticate said individual. The method may also include calculating deviations in said data from standard statistical norms belonging to the individual, where the standard statistical norms are established and adjusted periodically when the individual performs an authentication transaction using a data-based biometric apparatus. Another method wherein the extracted data comprises EKG data. Another method wherein the data comprises consumer healthcare indices that include at least one of heart rate, level of stress, mood, EKG diagnostic landmarks, and any other indices that can be extracted from a heartbeat. Another method wherein deviations from the standard statistical norms are defined as changes exceed certain norm thresholds. Another method wherein norm thresholds are calculated as representing values with some statistical probability, such as values external to an average plus/minus an x number of standard deviations.

In another example embodiment there may be one or more non-transitory computer readable media storing instructions to implement a sequence comprising extracting data from electro-physiological signals belonging to an individual, and using said data to authenticate said individual. The media may further store instructions to implement a sequence including calculating deviations in said data from standard statistical norms belonging to the individual, where the standard statistical norms are established and adjusted periodically when the individual performs an authentication transaction using a data-based biometric apparatus. Another media wherein the extracted data comprises EKG data. Another media wherein the data comprises consumer healthcare indices that include at least one of heart rate, level of stress, mood, EKG diagnostic landmarks, and any other indices that can be extracted from a heartbeat. Another media wherein deviations from the standard statistical norms are defined as changes exceed certain norm thresholds. Another media wherein wherein norm thresholds are calculated as representing values with some statistical probability, such as values external to an average plus/minus an x number of standard deviations Another example embodiment may be an apparatus comprising a pair of electrodes, and a processor coupled to said electrodes to develop electro-physiological signals from an individual and to use said data to authenticate that individual. The apparatus may include said processor to calculate deviations in said data from standard statistical norms belonging to the individual, where the standard statistical norms are established and adjusted periodically when the individual performs an authentication transaction using a data-based biometric apparatus. Another apparatus wherein the extracted data comprises EKG data. Another apparatus wherein the data comprises consumer healthcare indices that include at least one of heart rate, level of stress, mood, EKG diagnostic landmarks, and any other indices that can be extracted from a heartbeat. Another apparatus wherein norm thresholds are calculated as representing values with some statistical probability, such as values external to an average plus/minus an x number of standard deviations. Another apparatus may also be in the form of a computer, a cellular telephone or a television remote control.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer executed method comprising:
acquiring heartbeat data, using an electrocardiogram (EKG)-based biometric apparatus, from electro-physiological signals belonging to an individual to establish a statistical norm for said individual, said statistical norm based on acquired heartbeat data to establish baseline heartbeat data for the individual;

authenticating said individual based on newly acquired heartbeat data captured during a subsequent authentication;

determining if said newly acquired heartbeat data is a deviation from said statistical norm belonging to the individual, wherein said deviation from said statistical norm is defined as a change exceeding a certain statistical norm threshold, wherein said statistical norm threshold is calculated as representing a value with a statistical probability, wherein said deviation is a difference from said statistical norm that has occurred a number of times indicative of less than a 5% chance that the deviation from said statistical norm is not physiologically based and is only due to random chance;

keeping track of the number of said deviations beyond said statistical norm over time;

keeping track of the number of times the individual has been authenticated over said time;

determining a threshold frequency based on a number of said deviations with respect to a number of authentications over said time, wherein said number of said deviations is at least two;

revising said statistical norm when the number of deviations exceeds the threshold frequency; and subsequently authenticating said individual using the revised statistical norm and subsequently acquired heartbeat data.

2. One or more non-transitory computer readable media storing instructions to implement a sequence comprising:

acquiring heartbeat data, using an electrocardiogram (EKG)-based biometric apparatus, from electro-physiological signals belonging to an individual to establish a statistical norm for said individual, said statistical norm based on acquired heartbeat data to establish baseline heartbeat data for the individual;

authenticating said individual based on newly acquired heartbeat data captured during a subsequent authentication;

determining if said newly acquired heartbeat data is a deviation from said statistical norm belonging to the individual, wherein said deviation from said statistical norm is defined as a change exceeding a certain statistical norm threshold, wherein said statistical norm threshold is calculated as representing a value with a statistical probability, wherein said deviation is a difference from said statistical norm that has occurred a number of times indicative of less than a 5% chance that the deviation from said statistical norm is not physiologically based and is only due to random chance;

keeping track of the number of said deviations beyond said statistical norm over time;

keeping track of the number of times the individual has been authenticated over said time;

determining a threshold frequency based on a number of deviations with respect to a number of authentications over said time, wherein said number of said deviations is at least two;

revising said statistical norm when the number of deviations exceeds the threshold frequency; and subsequently authenticating said individual using the revised statistical norm and subsequently acquired heartbeat data.

3. The media of claim 2 further storing instructions to implement a sequence including calculating deviations in said data from standard statistical norms belonging to the individual, where the standard statistical norms are established and adjusted periodically when the individual performs an authentication transaction using a data-based biometric apparatus.

4. An apparatus comprising:

a pair of electrodes; and an electrocardiogram (EKG)-based biometric apparatus coupled to said electrodes to acquire electro-physiological signals from an individual to establish a statistical norm for said individual, said statistical norm based on acquired heartbeat data to establish baseline heartbeat data for the individual, to authenticate that individual based on newly acquired heartbeat data captured during a subsequent authentication, determining if said newly acquired heartbeat data is a deviation from said statistical norm belonging to the individual, wherein said deviation from said statistical norm is defined as a change exceeding a certain statistical norm threshold, wherein said statistical norm threshold is calculated as representing a value with a statistical probability, wherein said deviation is a difference from said statistical norm that has occurred a number of times indicative of less than a 5% chance that the deviation from said statistical norm is not physiologically based and is only due to random chance, keep track of the number of said deviations beyond said statistical norm over time; keep track of the number of times the individual has been authenticated over said time, determine a threshold frequency based on a number of said deviations with respect to a number of authentications over said time, wherein said number of said deviations is at least two, revise said statistical norm when the number of deviations exceeds the threshold frequency; and subsequently authenticating said individual using the revised statistical norm and subsequently acquired heartbeat data.

5. The apparatus of claim 4 said EKG-based biometric apparatus to calculate deviations in said data from standard statistical norms belonging to the individual, where the standard statistical norms are established and adjusted periodically when the individual performs an authentication transaction using a data-based biometric apparatus.

6. The apparatus of claim 4 in the form of a computer.

7. The apparatus of claim 4 in the form of a cellular telephone.

8. The apparatus of claim 4 in the form of a television remote control.

* * * * *